US008892656B2

(12) United States Patent
Li et al.

(10) Patent No.: US 8,892,656 B2
(45) Date of Patent: Nov. 18, 2014

(54) PERSONALIZED INFORMATION SUBSCRIBING AND DELIVERING OVER INSTANT MESSAGING

(75) Inventors: Ke Qin Li, Beijing (CN); Jun Tao Ma, Beijing (CN); Peng Zhang, Beijing (CN)

(73) Assignee: Alcatel Lucent, Boulogne-Billancourt (FR)

( * ) Notice: Subject to any disclaimer, the term of this patent is extended or adjusted under 35 U.S.C. 154(b) by 2180 days.

(21) Appl. No.: 11/117,403

(22) Filed: Apr. 29, 2005

(65) Prior Publication Data

US 2006/0190548 A1     Aug. 24, 2006

(30) Foreign Application Priority Data

Feb. 23, 2005   (CN) .......................... 2005 1 0006547

(51) Int. Cl.
*G06F 15/16* (2006.01)
*G06Q 10/00* (2012.01)
(52) U.S. Cl.
CPC ..................................... *G06Q 10/00* (2013.01)
USPC .......................................... 709/206; 709/207
(58) Field of Classification Search
USPC ........ 709/205, 206–207; 707/3; 715/752, 758
See application file for complete search history.

(56) References Cited

U.S. PATENT DOCUMENTS

| | | | | |
|---|---|---|---|---|
| 6,134,532 A * | 10/2000 | Lazarus et al. | ................... | 705/14 |
| 6,493,702 B1 * | 12/2002 | Adar et al. | ..................... | 707/706 |
| 6,745,193 B1 * | 6/2004 | Horvitz et al. | ................. | 707/796 |
| 7,031,961 B2 * | 4/2006 | Pitkow et al. | ......................... | 1/1 |
| 7,177,859 B2 * | 2/2007 | Pather et al. | ...................... | 707/3 |
| 7,200,606 B2 * | 4/2007 | Elkan | .................................... | 1/1 |
| 7,269,627 B2 * | 9/2007 | Knauerhase | .................. | 709/206 |
| 7,720,828 B2 * | 5/2010 | Bookstaff | ..................... | 707/705 |
| 7,730,012 B2 * | 6/2010 | Arrouye et al. | ........................ | 1/1 |
| 7,778,919 B2 * | 8/2010 | Waelbroeck et al. | ........... | 705/37 |
| 8,041,020 B2 * | 10/2011 | Drewry et al. | ........... | 379/211.01 |
| 8,095,523 B2 * | 1/2012 | Brave et al. | .................. | 707/705 |
| 8,331,958 B2 * | 12/2012 | Hein et al. | ................. | 455/456.3 |
| 8,364,664 B2 * | 1/2013 | Bennett | ......................... | 707/722 |
| 8,370,321 B2 * | 2/2013 | Chu et al. | ...................... | 707/707 |
| 8,661,028 B2 * | 2/2014 | Bennett | ......................... | 707/722 |
| 2002/0140625 A1 * | 10/2002 | Kidney et al. | .................. | 345/1.1 |
| 2003/0032409 A1 * | 2/2003 | Hutcheson et al. | ........... | 455/414 |
| 2003/0154254 A1 * | 8/2003 | Awasthi | ........................ | 709/206 |
| 2004/0158565 A1 * | 8/2004 | Kakuta et al. | .................... | 707/10 |
| 2004/0205065 A1 * | 10/2004 | Petras et al. | ........................ | 707/5 |
| 2004/0220925 A1 * | 11/2004 | Liu et al. | .......................... | 707/3 |
| 2004/0258215 A1 * | 12/2004 | DeVito et al. | .............. | 379/88.11 |
| 2005/0091209 A1 * | 4/2005 | Frank et al. | ........................ | 707/3 |
| 2006/0031203 A1 * | 2/2006 | Rosenbaum et al. | ............ | 707/3 |
| 2006/0064431 A1 * | 3/2006 | Kishore et al. | ................. | 707/102 |
| 2006/0100995 A1 * | 5/2006 | Albornoz et al. | ................. | 707/3 |
| 2007/0033191 A1 * | 2/2007 | Hornkvist et al. | ................. | 707/9 |
| 2007/0067297 A1 * | 3/2007 | Kublickis | ......................... | 707/9 |
| 2010/0268597 A1 * | 10/2010 | Bookstaff | .................. | 705/14.49 |

OTHER PUBLICATIONS

Chinese Office Action dated Aug. 4, 2010.

(Continued)

*Primary Examiner* — Thu Nguyen
*Assistant Examiner* — Angela Widhalm
(74) *Attorney, Agent, or Firm* — Harness, Dickey & Pierce

(57) ABSTRACT

A method for providing information to an instant messaging (IM) user includes sending information to the user via an instant message based on interest information provided by the user. The interest information may not be restricted to a predetermined set of interest information.

21 Claims, 3 Drawing Sheets

(56) References Cited

OTHER PUBLICATIONS

Chinese Office Action dated Oct. 26, 2011 and English translation of Chinese Office Action.

Chinese Office Action dated May 6, 2011 and English translation of Chinese Office Action.

* cited by examiner

PERSONALIZED INFORMATION SUBSCRIBING AND DELIVERING OVER INSTANT MESSAGING

FOREIGN PRIORITY INFORMATION

This application claims priority under 35 U.S.C. §119 on Chinese Patent Application No. 200510006547.3, filed on Feb. 23, 2005, in the Chinese Intellectual Property Office, the disclosure of which is incorporated by reference herein in its entirety.

FIELD OF THE INVENTION

Example embodiments of the present invention relate to a method for subscribing and delivering information to instant messaging users.

BACKGROUND OF THE INVENTION

Instant messaging (IM) has become a popular and convenient way for users to communicate with many kinds of terminals, for example, personal digital assistants (PDA), personal computers (PC), cellular phones, and other such devices. However, instant messaging may also be used as a communication platform to offer services in addition to conventional message exchange service. For example, weather forecast services may be delivered to instant messaging users via instant messaging.

SUMMARY OF THE INVENTION

The present invention relates to a method for providing an instant messaging (IM) user with information.

In an example embodiment of the present invention, information may be sent to a user via an instant message based on interest information provided by the user. The interest information may not be restricted to a predetermined set; for example, a set determined by a service provider. Instead, the interest information may be freely specified by the user.

In another example embodiment of the present invention an instant messaging user may send interest information via a first instant message and receive information based on the interest information via a second instant message. The interest information may not be restricted to a predetermined set; for example, a set determined by a service provider. Instead, the interest information may be freely specified by the user.

A text string may define at least a portion of the interest information that may be received, and at least a part of the text string may be used as an interest item. The information may be sent to the user based on the interest item.

Priority information for one or more interest items may be received and may be derived from the interest information. The information may be sent based on the interest items and the priority information.

The relevance of an information item (e.g., an article, a website, etc.) to a user may be determined based on the interest items and the priorities for interest items. The information item may be sent to the user based on the determined relevance.

Each interest item may include at least one keyword representing the interest information. A frequency of each keyword in at least one information item may be determined and the relevance to the user may be determined based on the determined frequencies and the priorities of the interest items.

The priority information may be associated with an interest item and may include a priority value. The priority value may be associated with the keyword included in the interest item. A user vector and a source vector may be formed and the relevance of the information item may be determined as a dot product of the user and source vectors. Each position in the user vector may be associated with a keyword and may include a priority value associated with the keyword. Each position within the source vector may be associated with a keyword in the user vector and may include a value equal to the determined frequency of the keyword in the information item.

The information items may be sent to the user in order of relevance, and/or based on a comparison of the determined relevance and a relevance threshold.

The information item may be filtered based on the determined relevance, and the information item may be sent to the user if the information item passes the filtering step.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EXAMPLE EMBODIMENTS OF THE PRESENT INVENTION

Figure 1:
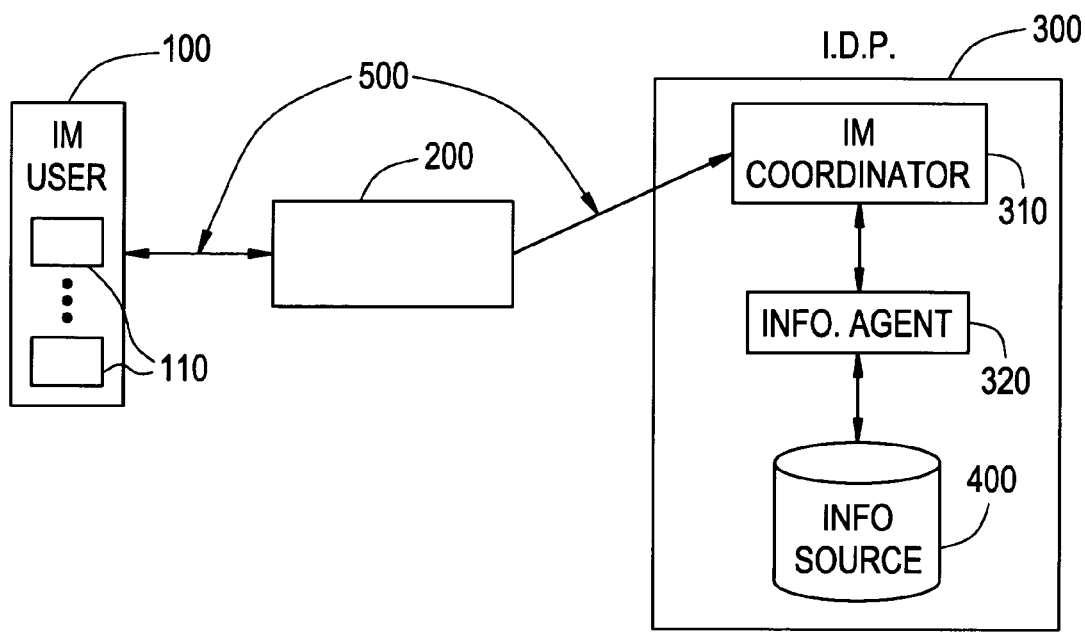
FIG. 1 illustrates a system for instant messaging according to an example embodiment of the present invention.

FIG. 1 illustrates an instant messaging system according to an example embodiment of the present invention. An instant messaging user 100 may use a client device 110 to access an instant messaging service, via an instant messenger server 200. Instant messaging services, and components thereof, are well-known in the art.

Instant messaging (IM) communications may involve an instantaneous communication between two users. Each user involved in the communication may transmit, receive and display communicated information. Instant messaging communications may involve the display of online presence information regarding other selected users. However, instant messaging communications may occur in the absence of online presence information.

The example embodiment of the system and components included therein, as illustrated in FIG. 1, may be suitable for, but not limited to, implementation of the example embodiments of the methods as described herein.

Referring to FIG. 1, the instant messaging system may deliver and exchange data between the instant messaging user 100 and an information delivery part (IDP) 300 via one or more intermediate instant messaging servers 200. The information delivery part 300 may include an instant messaging coordinator (IMC) 310 and one or more information agents (IA) 320. The instant messaging user 100 and the information delivery part 300 may be separated geographically, and may be connected with each other by networks, such as, one or more LANs ("Local Area Networks") or WANs ("Wide Area Networks").

The client device 110, of the instant messaging user 100, and the information delivery part 300 may include hardware components and software components. An example of a client device 110 is a PDA including software for performing desired operations. Examples of the information delivery part 300 may be a computer device with an operating system suitable to perform desired operations installed thereon. The client device 110 and the information delivery part 300 may include devices, which may be capable of establishing, for example, peer-to-peer communications. A software application may be loaded on the client device 110 for enabling communications initiated by the client device 110.

A communications connection 500 between the instant messaging user 100 and the information delivery part 300 forms a delivery channel, which may provide direct and/or indirect communication between the instant messaging user 100 and the information delivery part 300, irrespective of physical separation. The communications connection 500 may be set up, for example, using the TCP/IP protocol.

The client device 10 may have an internal or external memory for storing data and programs such as an operating system and/or one or more client programs.

One or more application programs may be installed on the internal or external storage of the client device 110. The client device 110 may further include, for example, lower-layered hardware devices for sending and receiving data, for example, a modem, a set-top box, a communication card, a satellite dish, etc. A client device 110 may also be a personal computer, a mobile telephone, a personal digital assistant (PDA), or any other suitable device may operate as the client device 110. For example, a mobile phone or PDA may include capabilities and may function in the same, or substantially the same, manner as the client device 110 by accessing a delivery network (e.g., a wireless delivery network) and communicating with the information delivery part 300.

One or more instant messaging and presence servers 200 may function to deal with instant messaging login/logoff operations, indicate an instant messaging user's presence on the instant messaging network, and receive and forward instant messages between the instant messaging users, all of which are well-known operations within, or associated with instant messaging. Instant messaging and presence servers 200 may be located anywhere and may communicate with each other through, for example, one or more IP networks.

As stated above, the information delivery part 300 may further include an instant messaging coordinator (IMC) 310, one or more information agents (IA) 320. The instant messaging coordinator 310 may be implemented using, for example, computer hardware and software alone or a human operator and computer hardware and software. The human operator may act as the instant messaging coordinator 310.

The information delivery part 300 may also include, optionally, an information source (IS) 400. FIG. 4 illustrates the information source 400 as a part of the information delivery part 300; however, the information source 400 may be separated geographically, and may be connected to the information delivery part 300 by networks, such as, one or more LANs ("Local Area Networks") or WANs ("Wide Area Networks"). The information source 400 may be a location where electronic data may be stored, for example, a web-server or the Internet. Information source 400 may also be a database, which keeps records of information items. Functions, which may be performed by example embodiments of the instant messaging coordinator 310, and the one or more information agents 320 will be discussed in more detail with respect to FIGS. 2 and 3, respectively.

As discussed above, in an example embodiment a human operator may be stationed at and may control/maintain, the instant messaging coordinator 310. In this example embodiment, the instant messaging coordinator 310 and the human operator will be collectively referred to as the instant messaging coordinator 310.

Figure 2:
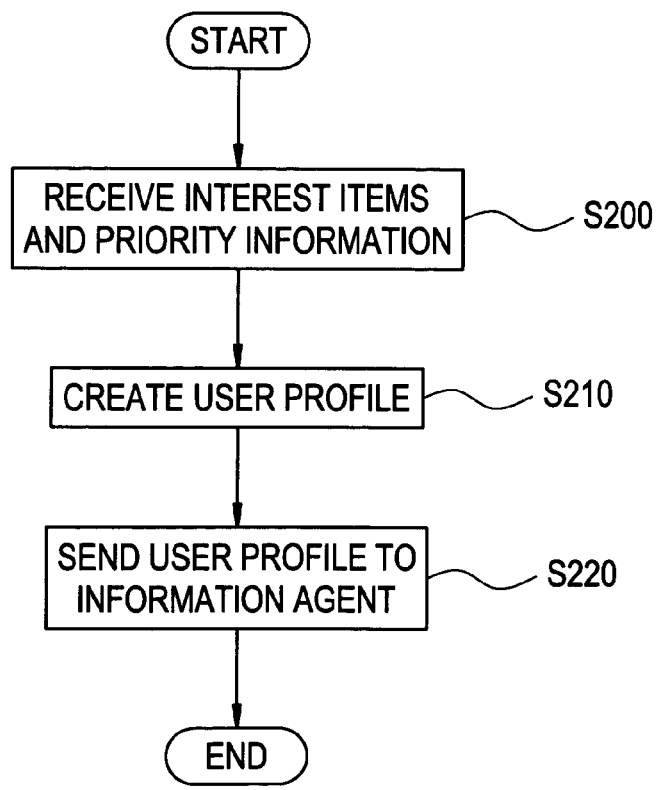
FIG. 2 illustrates an example embodiment of the method performed by an instant messaging coordinator illustrated in FIG. 1.

With regard to FIG. 2, at step S200 the instant messaging coordinator 310 may determine user interest items and corresponding priorities. The instant messaging user 100 may communicate interest and corresponding priority information to the instant messaging coordinator 310, for example, via instant messaging communication. The instant messaging user 100 may provide interest information to the instant messaging coordinator 310 via one or more instant messages. The interest information included in the instant message sent from the instant messaging user 100 may include, for example, one or more text strings. An example of a text string may be, "I like baseball a lot, basketball a little, and football somewhat."

The instant messaging coordinator 310 may generate keywords representing the interest items, which may comprise the interest information. For example, "baseball", "basketball", and "football", may be generated from the text string (shown above) provided by the instant messaging user 100 via an instant message. The instant messaging coordinator 310 may assign corresponding priority values to each of the keywords based on, for example, surrounding words also included in the instant message sent by the instant messaging user 100. That is, the instant messaging coordinator 310 may generate priority value, which may correspond to the surrounding words "a lot", "a little", and "somewhat". For example, priority values of 70, 21, and 40 may correspond to "a lot", "a little", and "somewhat", respectively. The instant messaging coordinator may assign "baseball", "basketball", and "football", priority values of 70, 21, and 40, respectively.

The instant messaging coordinator 310 may also obtain priority information and/or additional interest information through interaction with the instant messaging user 100. For example, the user may provide interest information, which may not include priority information. In response, the instant messaging coordinator 310 may solicit priority information from the instant messaging user 100, for example, via another instant message The instant messaging coordinator 310 may create a user interest vector [baseball, football, basketball] using the keywords generated from the text string provided by the instant messaging user 100. The instant messaging coordinator 310 may then generate a user priority vector [70, 21, 40] using the corresponding priority values generated based on the surrounding words included in the instant message provided by the instant messaging user 100. The creation of the user priority vector may also be referred to as "vectorizing the user interest vector". However, the term "vectorizing", as used herein, should not be limited to the above example.

At step S210, the instant messaging coordinator 310 may create a user profile, which may include the user interest vector [baseball, basketball, football] and the corresponding user priority vector [70, 21, 40]. The user profile may be represented, for example, by a combination of the user interest vector and the user priority vector (e.g., [baseball:70, football:20, basketball:10]).

At step S220, the user profile (i.e., the user interest vector and the user priority vector) may be sent to the information agent 320.

As discussed above, in another example embodiment the instant messaging coordinator 310 may be implemented without a human operator, for example, using computer hardware and software alone. In this example embodiment, at step S200, the instant messaging coordinator 310 may receive priority information together with interest items or keywords from the instant messaging user 100, which may be in the form of a user profile. As discussed above, the user profile may include a series of interest items or keywords followed by priority values, for example, "baseball:70, basketball:21, football:40".

In this example embodiment, the process may skip step S210 and at step S220, the user profile (i.e., the user interest vector and the user priority vector), which has been provided by the instant messaging user 100, may be sent to the information agent 320.

The functions, which may be performed by the information agent 320, will be discussed in more detail with regard to FIG. 3.

Figure 3:
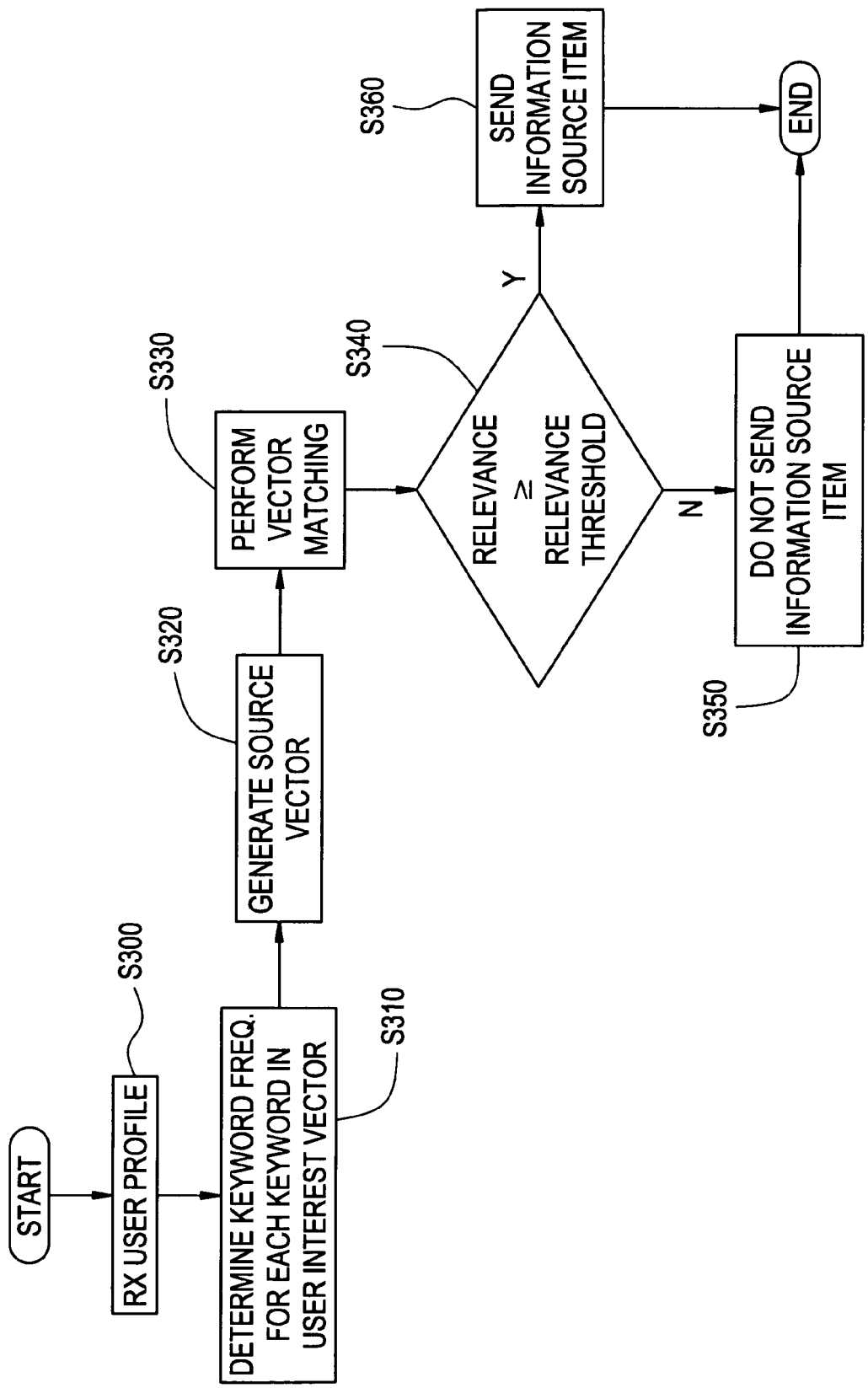
FIG. 3 illustrates an example embodiment of the method performed by an information agent illustrated in FIG. 1.
Figure 4:
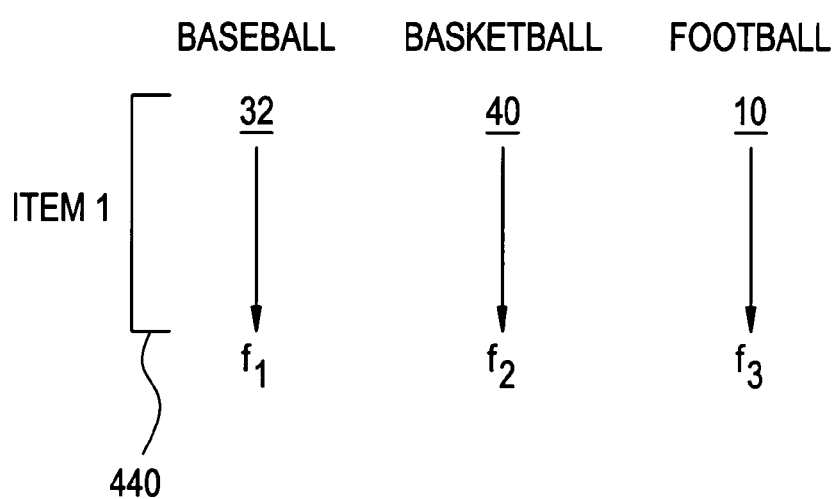
FIG. 4 illustrates an example embodiment of a table, which may be used to store information items and corresponding frequencies, according to the present invention.

With regard to FIG. 3, at step S300, the information agent 320 may receive the user profile (i.e., the user interest vector and the user priority vector) from the instant messaging coordinator 310. At step S310, the information agent 320 may search the information source 400, for information items. As stated above, the information source 400 may be, for example, the Internet or a database, which keeps records of information items. The information agent 320 may search the information source 400 for information items, which may include the keywords contained in the user profile (e.g., [baseball, basketball, football]) received from the instant messaging coordinator 310. The information agent 320 may determine the frequency of each keyword (in the user profile) in the information items found by the information agent 320.

At step S320, the information agent 320 may generate a source vector (e.g., [32, 40, 10]), which may match each keyword in the user profile with the determined frequency of that keyword in an information item. An example of a source vector in accordance with example embodiments of the present invention is illustrated in element 440 of FIG. 4. In the source vector 440, the values 32, 40, and 10 may be frequencies, which correspond to the keywords Baseball, Basketball and Football, respectively. Although only the values 32, 40, and 10 are shown in FIG. 4, the variables $f_1$, $f_2$, and $f_3$, are also illustrated such that it will be understood that these frequencies may take on any determined frequency. The information agent 320 may store the source vector of an information item (e.g., as illustrated in FIG. 4) or source vectors corresponding to several information items in, for example, a table within a database (not shown).

At step S330, the user priority vector, as described above, may be vector matched with the source vector in order to obtain a relevance value. For example, an "inner product" of a user priority vector (e.g., $X_1$=[70 21 40]), and a source vector (e.g., $X_2$=[32, 40, 10]) may produce a value, which may be indicative of the relevance of the information item to the instant messaging user 100. An example of the calculation of an inner product is shown below.

Assuming the angle between the two vectors $X_1$ and $X_2$ is θ, then the "inner product" (e.g., the cosine value of the angle formed by two vectors) of the two vectors $X_1$ and $X_2$ may be:

$$\cos\theta = \frac{X1 \cdot X2}{(|X1| \times |X2|)} =$$

-continued
$$\frac{70 \times 32 + 21 \times 40 + 40 \times 10}{\sqrt{70^2 + 21^2 + 40^2} \times \sqrt{32^2 + 40^2 + 10^2}} = \frac{3480}{\sqrt{6941} \times \sqrt{2724}} = 0.8.$$

At step S340, the information agent 320 may determine if the determined relevance is greater than or equal to a relevance threshold. The relevance threshold may be an arbitrary value from 0 to 1, inclusive, set by the instant messaging coordinator 310. However, the value may also be dictated or adjusted by the instant messaging user 100, via, for example, an instant message to the instant messaging coordinator 310. At step S350, if the determined relevance is less than the relevance threshold, the information agent 320 may filter out and not send the information item to the instant messaging user 100.

Returning to step S360, if the determined relevance is greater than or equal to the relevance threshold, the information agent 320 may send the information item to the instant messaging user 100 via, for example, an instant message.

Although example embodiments have been described with respect to a single information item, more than one information item may be retrieved at a time. For example, one or more information item may be retrieved from a single information source 400, or multiple information items may be retrieved from multiple information sources 400. When more than one information item is retrieved from the information source 400, a word by message matrix may be created. An example word by message matrix is shown below:

|  | Baseball | Football | Basketball | ... |
|---|---|---|---|---|
| Item 1 | 2 | 3 | 1 | ... |
| Item 2 | 5 | 2 | 3 | ... |
| Item 3 | 4 | 8 | 2 | ... |
| Item 4 | 7 | 3 | 5 | ... |
| ... | ... | ... | ... |  |

The information agent 320 may use row-by-row vector matching to determine the relevance value of each information item. That is, each row of the word-by-message matrix may be vector matched in the same manner as described above with respect to FIG. 3. The information items, which are determined to have a relevance value greater than or equal to the relevance threshold may be ordered and sent to the instant messaging user 100 in descending or ascending order of relevance.

Although the filtering as disclosed herein has been associated with the comparison of a determined relevance with a relevance threshold, it will be understood that any suitable filtering technique may be used. For example, frequency thresholds may be used in place of or in connection with the relevance determination.

Although example embodiments of the present invention have been discussed with respect to the use of instant messaging communication for providing user interest information, it will be understood that user interest information may be provided in any suitable manner. For example, the instant messaging coordinator 310 may provide the instant messaging user 100 with a form, which may enable the instant messaging user to outline his/her interests through fields such as "LIKES" and/or "DISLIKES". In another example, the interest information may be in the form of one or more words and/or sentences.

As described above, the example embodiments of the present invention will provide better/customized features for users. Instant messaging users may subscribe their interests, which may be processed in an information delivery part and formed into a user profile. An instant messaging user may also change their user profiles dynamically. Vectorized user profiles may provide an economical approach to match a user's profile in the information source.

Example embodiments of the present invention being thus describe, would be obvious to one of ordinary skill in the art that the same may be varied in a variety of ways. Such variations are not to be regarded as a departure from the invention, and all such modifications are intended to be included within the scope of the invention.

We claim:

1. A method for providing information to an instant messaging (IM) user, the method comprising:
   sending, by an information delivery device, information to the user via an instant message based on interest information provided by the user, the interest information not being restricted to a predetermined set of interest information offered by an information provider; wherein
   the information is sent to the user based on the interest information and priority information provided by the user, the interest information being in the form of a text string provided by the user, and the priority information being generated based on the context of the text string, and
   the priority information is indicative of a relative importance of the interest information to the user.

2. The method of claim 1, further comprising:
   receiving the text string, defining at least a portion of the interest information, from the user via the instant message and
   using at least a portion of the text string as an interest item; and wherein
   the sending step sends the information to the user based on the interest item.

3. The method of claim 1, further comprising:
   receiving the priority information for one or more interest items; and wherein
   the sending step sends the information to the user based on the interest items and the priority information.

4. The method of claim 3, wherein the priority information is user defined priority information.

5. The method of claim 3, further comprising:
   determining the relevance of an information item to a user based on the interest items and the priority information; and wherein
   the sending step sends the information item to the user based on the determined relevance.

6. The method of claim 5, wherein each interest item includes at least one keyword representing the interest item, and the determining step further comprises:
   determining a frequency of each keyword in at least one information item; and
   determining the relevance based on the determined frequencies of the interest items and the priority information.

7. The method of claim 6, wherein the priority information associated with an interest item includes a priority value associated with the keyword included in the interest item, and the determining of the relevance further comprises:
   forming a user vector where each position in the vector is associated with a keyword and includes a priority value associated with the keyword; and
   forming a source vector for an information item where each position within the source vector is associated with a keyword in the user vector and includes a value equal to the determined frequency of the keyword in the information item; and
   determining the relevance as a dot product of the user and source vectors.

8. The method of claim 7, wherein the sending step further comprises:
   sending the information items to the user in order of relevance.

9. The method of claim 7, wherein the sending step sends the information item based on a comparison of the determined relevance and a relevance threshold.

10. The method of claim 5, wherein the sending step further comprises:
    sending the information item to the user in order of relevance.

11. The method of claim 1, further comprising:
    determining the relevance of an information item to a user based on the interest information; and
    sending the information item to the user based on the determined relevance.

12. The method of claim 11, further comprising:
    receiving the priority information for the interest information from the user; and wherein
    the determining step determines the relevance of the information item based on the interest information and the priority information.

13. The method of claim 11, wherein the sending step sends the information item based on a comparison of the determined relevance and a relevance threshold.

14. The method of claim 11, further comprising:
    filtering the information item based on the determined relevance; and wherein
    the sending step sends the information item to the user if the information item passes the filtering step.

15. The method of claim 1, further comprising:
    receiving the priority information for the interest information from the user.

16. The method of claim 1, wherein the interest information is not from a predetermined set of interest information offered by an information provider.

17. The method of claim 1, wherein at least a portion of the interest information is at least one word.

18. The method of claim 1, wherein at least a portion of the interest information is in a format.

19. A method for obtaining information via instant messaging (IM) services, the method comprising:
    sending, by a user client device, interest information, which is not restricted to a predetermined set of interest information, via a first instant message, wherein the interest information is in the form of a text string;
    generating, by an instant messaging system, priority information associated with the interest information based on the context of the text string;
    generating, by the instant messaging system, information based on the interest information and priority information; and
    receiving, at the user client device, the information, via a second instant message, based on the interest information provided via the first instant message; wherein
    the priority information is indicative of a relative importance of the interest information to the user.

20. The method of claim 1, wherein the context of the text string refers to contextual language of the interest information and the context is also in the form of a text string.

21. The method of claim 19, wherein the context of the text string refers to contextual language of the interest information and the context is also in the form of a text string.

\* \* \* \* \*